(12) United States Patent
Chen et al.

(10) Patent No.: US 7,452,278 B2
(45) Date of Patent: Nov. 18, 2008

(54) WEB ACCESS TO SECURE DATA

(75) Inventors: Ling Tony Chen, Bellevue, WA (US);
Mark VanAntwerp, Redmond, WA (US); Van Christopher Van, Snoqualmie, WA (US); Noah Heller, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 705 days.

(21) Appl. No.: 10/434,569

(22) Filed: May 9, 2003

(65) Prior Publication Data
US 2004/0224771 A1 Nov. 11, 2004

(51) Int. Cl.
*A63F 13/00* (2006.01)
(52) U.S. Cl. .............. 463/42; 463/29; 463/39; 463/43; 705/78; 705/79; 705/153; 705/53; 705/151; 705/152; 705/201
(58) Field of Classification Search .......... 463/40, 463/42
See application file for complete search history.

(56) References Cited

U.S. PATENT DOCUMENTS

| 5,764,955 | A | * | 6/1998 | Doolan | 709/223 |
| 5,778,173 | A | * | 7/1998 | Apte | 726/2 |
| 5,966,705 | A | | 10/1999 | Koneru et al. | 707/9 |
| 6,163,772 | A | * | 12/2000 | Kramer et al. | 705/79 |
| 6,277,026 | B1 | * | 8/2001 | Archer | 463/42 |
| 2003/0061515 | A1 | | 3/2003 | Kindberg et al. | 713/201 |
| 2003/0071724 | A1 | | 4/2003 | D'Amico | 340/506 |
| 2003/0079120 | A1 | | 4/2003 | Hearn et al. | 713/150 |
| 2003/0084350 | A1 | | 5/2003 | Eibach et al. | 713/201 |

FOREIGN PATENT DOCUMENTS

WO WO 00/48358 8/2000

OTHER PUBLICATIONS

Warcraft III. "Lordaeron Ladder Information." n.d.: 2pp. Available file://C:\DOCUME~\MARQUI~1.000/LOCALS~1/Temp\NIMNJ1YJ.htm.
Fox, Armanod and Steven Gribble. "Security On the Move: Indirect Authentication Using Kerberos." *University of California at Berkeley*. BNSDOCID: XP-00218816 pp. 1-11.
Steiner, Jennifer G., Neuman, Clifford, & Schiller, Jeffrey. "Kerberos: An Authentication Service for Open Network Systems." *USENIX Winter Conference*, Feb. 9-12, 1988. BNSDOCID: XP 000671489 pp. 191-202.

* cited by examiner

*Primary Examiner*—Robert E Pezzuto
*Assistant Examiner*—Sunit Pandya
(74) *Attorney, Agent, or Firm*—Workman Nydegger

(57) ABSTRACT

Controlling access to secure data and services by versatile computers outside a secure environment, which communicates with limited dedicated devices such as game consoles, over a secure network such as a virtual private network. The versatile computing devices obtain access over an insecure network, such as the Internet, through a trusted partner Web site that authenticates users of the site and relays requests to the secure environment. The Web site uses a certificate for a predefined level of secure access to the secure environment. A link is established between a user's Web ID authenticated by the Web site and a gamer tag used within the secure environment. Access is limited as a function of the Web ID, gamer tag, and a Web site partner ID. A Web cache stores and provides some secure data, minimizing disruption to the secure environment's primary function to service the dedicated devices.

34 Claims, 13 Drawing Sheets motogp ~ 502

SCOREBOARDS

◀ Phillip Island | Sheridan | Credits shooter ▶

506 ~

| | | | | |
|---|---|---|---|---|
| 7605 | FLOYDALLAIX | 1:25.18 | Honda v4 | 25/26/28/27 |
| 7606 | Steel2003 | 1:25.18 | Honda v4 | 28/27/27/28 |
| 7607 | Demondude | 1:25.18 | Honda v4 | 12/13/12/15 |
| 7608 | Doc   504 | 1:25.18 | Honda v4 | 26/27/26/27 |
| 7609 | BIG FUNN105 | 1:25.18 | Honda v4 | 30/20/30/30 |
| 7610 | P Escobar | 1:25.18 | Honda v4 | 30/20/30/30 |
| 7611 | Sir Plasma | 1:25.18 | Honda v4 | 30/20/30/30 |

◀▶ CHANGE BOARD    ▲▼ PAGE UP/DOWN    (B) BACK motorgrandprix.com

*FIG. 8A*

WEB ACCESS TO SECURE DATA

FIELD OF THE INVENTION

The present invention generally relates to controlling access to data and services of a secure computing environment; and more specifically, pertains to controlling access by versatile and convenient computing devices through a trusted partner Web site to a secure computing environment that primarily provides services over a secure network to dedicated devices having access only to the secure computing environment.

BACKGROUND OF THE INVENTION

The popularity of multiplayer online games on the Internet has exploded in recent years. Unlike conventional single player electronic games, multiplayer online games enable a player to participate in games with other players, either as an individual or as a team member. The multiplayer aspect of these games adds to the players' gaming experience by offering new gaming considerations, including strategy, teamwork, and rivalries.

In order to enable playing of a multiplayer online game, host services must be provided by either an individual or a third-party host. Host services are typically executed on a host computer or server that determines who the game participants are, and whether new players may be added to each game session.

Examples of multiplayer online games that are hosted by third-party providers can be found at many gaming Web sites, including Microsoft Corporation's Internet Game Zone, which provides a myriad of single player and multiplayer online games that are played by over a half-million users daily. In order to play most of the games on such a gaming site, it is necessary for users to download (or separately procure) a copy of the game the user wishes to play. Some of these games may typically be downloaded for free, while others must be purchased, either online, or at a retail outlet. In addition, many gaming sites offer "premium" games that can only be accessed if the user has paid a membership fee to play the games, or has agreed to pay a usage fee (e.g., an hourly, daily, or monthly fee).

In contrast to Internet gaming Web sites that are broadly accessible over the Internet using a conventional browser executing on a conventional computer, a more secure and limited access gaming environment is provided by a gaming service such as Microsoft Corporation's XBOX LIVE™, which is dedicated specifically to enabling players to connect only with dedicated XBOX™ game consoles using a broadband Internet connection, so that users of the XBOX game console can participate in multiplayer games within the XBOX LIVE gaming environment. Only those who have paid an annual fee and have registered their game console with the XBOX LIVE gaming service when signing up for the online gaming service are able to participate in such games. Although the connection between the participants' XBOX game consoles and the gaming service is over the Internet, this communication uses virtual private network (VPN) tunnels to ensure security and employs the user datagram protocol (UDP) instead of the more common transmission control protocol/internet protocol (TCP/IP) for the communication of data packets.

These measures provide secure communication with the gaming service by the dedicated game consoles, however, this security inherently prevents communication with the gaming service through computing devices that are more versatile and convenient to use for some functions, such as entering text. Dedicated game consoles are designed for use with game controllers that are optimized for playing games, and are not designed for use in entering text, and carrying out other functions more easily done with a computer keyboard. Also, game consoles are often not readily available in offices, libraries, and other places where access to a personal computer (PC) is commonly provided. Further, requiring secure communication through a VPN tunnel is less convenient than enabling general communication over a conventional network such as over the Internet via the World Wide Web (WWW). However, for many reasons, it is desirable to access data within the gaming service through a conventional network with a versatile computer such as a PC, to check the status of games, verify billing records, enter messages to other users, control game use by a minor child, and carry out a variety of other functions.

Of course, it is possible to modify the gaming service to allow access through insecure communication networks, e.g. using a browser program running on a PC. However, permitting less secure access would inherently subject the gaming service to attacks, excessive traffic, and additional costs associated with maintaining an open, publicly accessible gaming service. These dangers would likely degrade the service provided to game participants and require increased fees to the participants. Another alternative is to modify the game consoles to enable use of a keyboard, rendering of Web pages, and other increased functionality, so that the game console has much the same ability to access Web sites on the Internet as general purpose computing devices. However, such changes would likely increase costs of the game consoles to game participants, reduce the security of the gaming system and gaming environment, and reduce the market competitiveness of such modified game consoles.

Instead, it is desirable to minimize costs by maintaining the more dedicated functionality of the game consoles (or other devices that are dedicated to a primary function, such as playing games). It is also desirable to maintain high speed communication and the least amount of traffic with the gaming service (or other secure service), and to ensure the security of the system by continuing to require VPN communication between the dedicated game consoles and the secure gaming service. Thus, an ideal solution to this problem will permit controlled access to the secure gaming service with a conventional and convenient computing device, without jeopardizing the security of the gaming service.

SUMMARY OF THE INVENTION

The present invention provides a method and system for controlling access to secure data and secure data services within a secure data service environment from outside the secure data service environment. The secure data service environment communicates with dedicated devices, such as game consoles, over a secure network, such as through a VPN tunnel. The secure data service environment strictly controls access and is not open to general access by users of more versatile computing devices, such as general purpose PCs. Instead, the present invention enables controlled access by more versatile computing devices through an insecure network connection. As used herein, the term "insecure network" refers to communication over a network such as the Internet using conventional TCP/IP or the like, and without using techniques such as VPN tunnels (other than secure socket layer (SSL) certificates and authentication), to prevent the communication from being intercepted by a third party. Controlled access is provided through one or more trusted partner Web sites that authenticate users of the versatile computing devices and relay requests to the secure data service environment.

The present invention establishes a link between a user's account identifier that is associated with the trusted partner Web site, referred to as a user-partner identifier, and the user's account identifier, which is associated with the secure data service environment and is referred to as a user-service identifier. The user-partner identifier is used by the partner Web site to authenticate the user who is communicating with the Web site over the insecure network from a versatile computing device, e.g., a general purpose PC. The user-service identifier is used to identify the user who has registered with the secure data service environment that provides secure data and services and maintains the secure communication network to access the dedicated devices. Preferably, the user-service identifier comprises an internal private portion known only to the secure data service environment, and a corresponding public portion, such as a name tag, by which the user is known to other users of the secure data service environment. The user provides private information, such as a credit card number, to the secure data service environment when establishing the user-service identifier. The user provides the same private information to the partner Web site. The partner Web site communicates the private information to the secure data service environment when a link is to be established between the user-partner identifier and the user-service identifier.

The secure data service environment determines whether a request for access to the secure data service environment is authentic when the request is received from the partner Web site on behalf of the user of the versatile computing device. The request is assumed to be authentic if received from a partner Web site that also provides a valid digital certificate and/or other data defining data access limitations. If the request is authentic, the secure data service environment provides the requested access to the secure data and services over the insecure network to the partner Web site, and thus to the versatile computing device. The request includes the user-partner identifier, which is linked to the user-service identifier. Thus, the access is limited by permission settings for the user-service identifier. The request also identifies the partner Web site with a partner identifier, which is preferably encrypted in the digital certificate obtained prior to allowing communication between the partner Web site and the secure data service environment. When the partner applies for the digital certificate, the partner identifier is associated with a level of access authority that applies to any requests from the partner Web site.

The secure data service environment preferably uses a public Web security gateway to perform public/private key authentication of a request from a partner Web site. Authenticated requests are then decrypted and communicated over a dedicated, but insecure communication channel to a Web cache. The Web cache determines other access limitations as a function of the partner identifier, the user-partner identifier, and the user-service identifier. The Web cache also stores in memory a large amount of frequently accessed secure data and recently accessed secure data, which can be quickly returned to the requesting partner Web site for use by the user of the versatile computing device. If the requested secure data is not available in the memory of the Web cache, the requested secure data or secure service is accessed from a core portion of the secure data service environment whose primary function is to provide secure data services to the dedicated devices through the secure communication network. In any case, any data returned to the requesting partner Web site is preferably formatted according to standard specifications of a markup language for data transfer (e.g., SOAP). Preferably the partner Web site will transform this data (e.g., into HTML) for display in a Web page rendered by a browser executing on the user's versatile computing device.

Examples of secure data and services include a leaderboard of game player rankings, statistics regarding games or other services provided by the secure data service environment, a friends list for communicating with other users associated with the user of the versatile computing device, account status and settings, a tournaments service for creating and managing game tournaments, a team management service for managing a group of users, a user control service such as a parental control service for selectively controlling a child's access to secure data and services, a download service for selectively obtaining secure data and services from the secure data service environment, and a variety of other data and functions related to the secure data service environment.

Another aspect of the invention is directed to a method and system for securely communicating unencrypted messages that were originally received in encrypted form from a partner network service over an insecure communication channel. An initially encrypted message associated with a certificate is decrypted the partner identifier and communication port identifier of the partner network service are determined. These data are added to a header of the message to form a modified message. The modified message is communicated over the insecure communication channel without encryption. Without the encryption, the messages can be communicated more quickly. A further aspect of the invention is directed to a memory medium on which are stored machine instructions for carrying out the steps of the method described above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein:

FIG. 8A (Prior Art) is a screen shot of a scoreboard display produced by a dedicated gaming device;

DESCRIPTION OF THE PREFERRED EMBODIMENT

A preferred embodiment of the present invention is now described with regard to an exemplary application in providing access to secure data and services of a secure online electronic gaming environment that is accessible using dedicated game consoles, through secure communications between the dedicated game consoles (such as Microsoft Corporation's XBOX™ game consoles) and the online electronic gaming environment (such as Microsoft Corporation's XBOX LIVE™). Because these dedicated game consoles have limitations on data entry, data display, printing, and other functional aspects, access to the secure data and services is provided to more versatile computing devices only through partner Web sites that communicate over an insecure network as authorized intermediaries between the secure online electronic gaming environment and the versatile computing devices.

Exemplary Operating Environment

Figure 1:
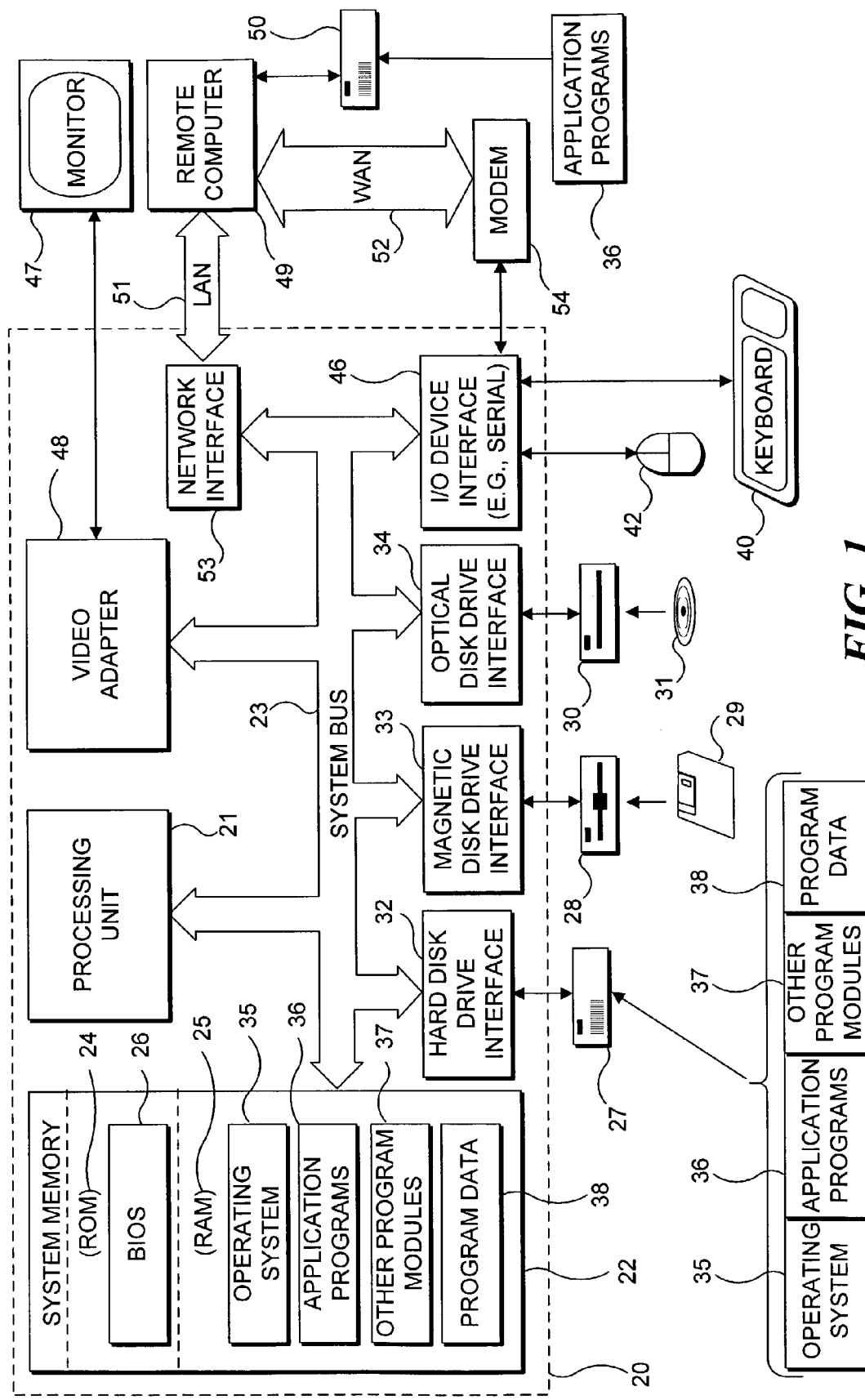
FIG. 1 is a schematic block diagram of an exemplary personal computer (PC) system suitable for implementing the present invention, in regard to both a server and a client computer.

FIG. 1 and the following discussion are intended to provide a brief, general description of a suitable computing environment for use in implementing portions of the present invention, including executing a Web browser such as Microsoft Corporation's INTERNET EXPLORER™ for accessing Web Pages over the Internet or providing the functionality to control access to a secure online electronic gaming environment such as Microsoft Corporation's XBOX LIVE™. Although not required, a portion of the present invention will be described in the general context of computer executable instructions, such as program modules that are executed by a PC, server, or other computing device. Generally, program modules include routines, programs, objects, components, data structures, etc. that perform particular tasks or implement particular abstract data types. Those skilled in the art will appreciate that this invention may be practiced with other computing system configurations that include game consoles, TV set-top boxes, hand held devices, pocket personal computing devices, digital cell phones, peripheral devices, multiprocessor systems, network PCs, minicomputers, mainframe computers, industrial control equipment, automotive equipment, aerospace equipment, and other microprocessor-based or consumer electronic devices. The invention can also be practiced in distributed computing environments where tasks are performed by remote processing devices that are linked through a communications network. In a distributed computing environment, program modules may be located in both local and remote memory storage devices.

With reference to FIG. 1, an exemplary system for implementing steps of the present invention with regard to a secure server, a public Web server, or a client computing device includes a general purpose computing device in the form of a conventional PC 20. PC 20 is provided with a processing unit 21, a system memory 22, and a system bus 23. The system bus couples various system components, including the system memory, to processing unit 21 and may be any of several types of bus structures, including a memory bus or memory controller, a peripheral bus, and a local bus using any of a variety of bus architectures. The system memory includes read-only memory (ROM) 24 and random access memory (RAM) 25. A basic input/output (BIOS) system 26, containing the basic routines that help to transfer information between elements within the PC 20, such as during start up, is stored in ROM 24.

The PC 20 further includes a hard disk drive 27 for reading from and writing to a hard disk (not shown), a magnetic disk drive 28 for reading from or writing to a removable magnetic disk 29, and an optical disc drive 30 for reading from or writing to a removable optical disc 31, such as a CD-ROM or other optical media. Hard disk drive 27, magnetic disk drive 28, and optical disc drive 30 are connected to system bus 23 by a hard disk drive interface 32, a magnetic disk drive interface 33, and an optical disc drive interface 34, respectively. The drives and their associated computer-readable media provide nonvolatile storage of computer-readable machine instructions, data structures, program modules, and other data for PC 20. Although the exemplary environment described herein employs a hard disk, a removable magnetic disk 29, and a removable optical disc 31, it will be appreciated by those skilled in the art that other types of computer-readable media, which can store data that are accessible by a computer, such as magnetic cassettes, flash memory cards, digital video discs, Bernoulli cartridges, random access memories (RAMs), ROMs, and the like, may also be used in the exemplary operating environment. A number of program modules may be stored on the hard disk, magnetic disk 29, optical disc 31, ROM 24 or RAM 25, including an operating system 35, one or more application programs 36, other program modules 37, and program data 38.

A user may enter commands and information into PC 20 through input devices such as a keyboard 40 and a pointing device 42. Other input devices (not shown) may include a microphone, joystick, game pad, satellite dish, scanner, digital camera, or the like. These and other input devices are often connected to processing unit 21 through an input/output (I/O) device interface 46 that is coupled to the system bus. Output devices, such as a printer (not shown), may also be connected to processing unit 21 through I/O device interface 46 that is coupled to the system bus. The term IPO device interface is intended to encompass each interface specifically used for a serial port, a parallel port, a game port, a keyboard port, a PS/2 port, a USB port and/or other communication port. Similarly, a monitor 47 or other type of display device is also connected to system bus 23 via an appropriate interface, such as a video adapter 48, and is usable to display graphical user interfaces, Web pages, and/or other information. In addition to the monitor, PCs are often coupled to other peripheral output devices (not shown), such as speakers (through a sound card or other audio interface—not shown).

PC 20 may operate in a networked environment using logical connections to one or more remote sources, such as a remote computer 49. Remote computer 49 may be another PC, a server (which is typically generally configured much like PC 20), a router, a network PC, a peer device, a satellite, or other common network node, and typically includes many or all of the elements described above in connection with PC 20, although only an external memory storage device 50 has been illustrated in FIG. 1. In a networked environment, program modules depicted relative to PC 20, or portions thereof, may be stored in the remote external memory storage device. The logical connections depicted in FIG. 1 include a local area network (LAN) 51 and a wide area network (WAN) 52, such as the Internet. Such networking environments are common in offices, enterprise-wide computer networks, intranets, and the Internet.

When used in a LAN networking environment, PC 20 is connected to LAN 51 through a network interface or adapter 53. When used in a WAN networking environment, PC 20 typically includes a modem 54 or other means for establishing communications over WAN 52, which is an insecure public network. Modem 54, which may be internal or external, is typically coupled directly to the system bus via an internal slot, coupled to the bus via I/O device interface 46, or coupled to the bus via network interface 53. For example, modem 54 may be a broadband modem, such as an asynchronous digital subscriber line (ADSL) modem, that is coupled to the system bus via a USB interface. It will be appreciated that the network connections shown are exemplary and other means of establishing a communications link between the computers may be used, such as wireless communication and wide band network links.

Exemplary Dedicated Gaming Device

Figure 2:
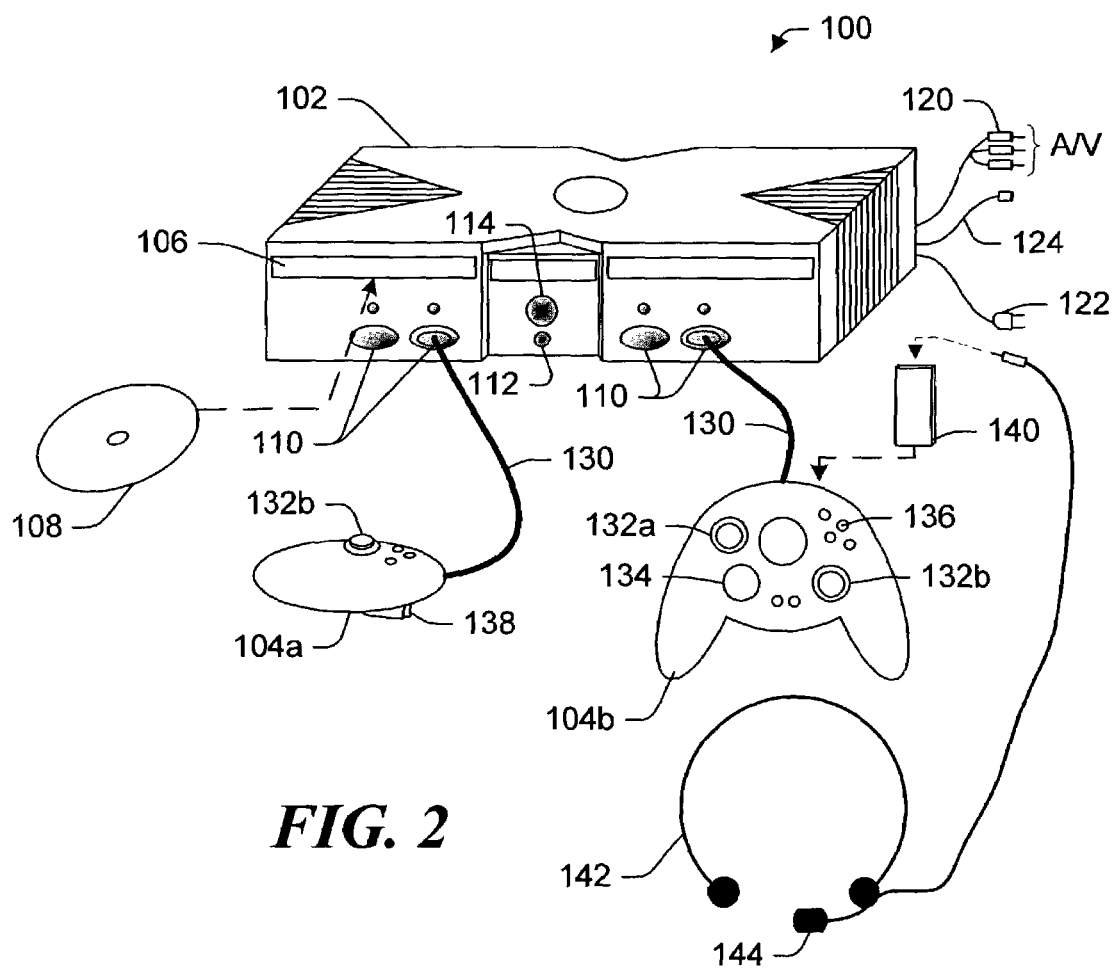
FIG. 2 illustrates an exemplary electronic gaming system that includes a game console and support for up to four user input devices.

As shown in FIG. 2, an exemplary dedicated electronic gaming system 100 that is suitable for secure interaction with the secure online electronic gaming environment includes a game console 102 and support for up to four user input devices, such as controllers 104a and 104b. Game console 102 is equipped with an internal hard disk drive (not shown in this Figure) and a portable media drive 106 that supports various forms of portable optical storage media, as represented by an optical storage disc 108. Examples of suitable portable storage media include DVD discs and CD-ROM discs. In this gaming system, game programs are preferably distributed for use with the game console on DVD discs, but it is also contemplated that other storage media might instead be used on this or other types of systems that employ the present invention. Game programs can also be downloaded to dedicated electronic gaming system 100 through secure communication with the secure online electronic gaming environment.

On a front face of game console 102 are four slots 110 for connection to supported controllers, although the number and arrangement of slots may be modified. A power button 112, and an eject button 114 are also positioned on the front face of game console 102. Power button 112 controls application of electrical power to the game console, and eject button 114 alternately opens and closes a tray (not shown) of portable media drive 106 to enable insertion and extraction of storage disc 108, so that the digital data on it can be read for use by the game console.

Game console 102 connects to a television or other display monitor or screen (not shown) via audio/visual (A/V) interface cables 120. Such displays typically have limited capabilities for displaying text. A power cable plug 122 conveys electrical power to the game console when connected to a conventional alternating current line source (not shown). Game console 102 includes an Ethernet data connector 124 to transfer and receive data over a network (e.g., through a connection to a hub or a switch—not shown), or over the Internet, for example, through a connection to an xDSL interface, a cable modem, or other broadband interface (not shown). However, interfacing with the secure electronic gaming environment is generally performed through secure communications. Other types of game consoles that implement the present invention may be coupled together or to a remote server, by communicating using a conventional telephone modem.

Each controller 104a and 104b is coupled to game console 102 via a lead (or alternatively through a wireless interface). In the illustrated implementation, the controllers are universal serial bus (USB) compatible and are connected to game console 102 via USB cables 130. Game console 102 may be equipped with any of a wide variety of user devices for interacting with and controlling the game software. As illustrated in FIG. 2, each controller 104a and 104b is equipped with two thumbsticks 132a and 132b, a D-pad 134, buttons 136, and two triggers 138. These controllers are merely representative, and other gaming input and control devices may be substituted for or added to those shown in FIG. 2 for use with game console 102. However, each controller 104a and 104b has limited capability for entering and manipulating text, navigating menus, and other functions not primarily associated with interacting with games.

A removable function unit 140 can optionally be inserted into controller 104 to provide additional features and functions. For example, a portable memory unit (enables users to store game parameters and port them for play on other game consoles, by inserting the portable MU into a controller connected to the other game console. Another removable functional unit comprises a voice communication unit that enables a user to verbally communicate with other users locally and/or over a network. Connected to the voice communication unit is a headset 142, which includes a boom microphone 144. In the described implementation, each controller is configured to accommodate two removable function units, although more or fewer than two removable function units or modules may instead be employed.

Gaming system 100 is capable of playing, for example, games, music, and videos. It is contemplated that other functions can be implemented using digital data stored on the hard disk drive or read from optical storage disc 108 in drive 106, or using digital data obtained from an online source, or from functional unit 140. For example, gaming system 100 is potentially capable of playing:

Game titles stored on CD and DVD discs, on the hard disk drive, or downloaded from an online source;

Digital music stored on a CD in portable media drive 106, in a file on the hard disk drive (e.g., Windows Media Audio™ (WMA) format), or derived from online streaming sources on the Internet or other network; and Digital A/V data stored on a DVD disc in portable media drive 106, or in a file on the hard disk drive (e.g., in an Active Streaming Format), or from online streaming sources on the Internet or other network.

It is contemplated that other functions can be implemented by gaming system 100 using digital data stored on the hard disk drive or read from optical storage disc 108 in drive 106, or from an online source, or from a function unit or module.

Although gaming system 100 is capable of the above and various other functions, it must be emphasized that, as supplied, gaming system 100 is still a device dedicated to a limited set of functions, primarily those related to playing games, listening to music, and viewing video and other graphic images. As supplied, gaming system 100 is incapable of printing, browsing the Internet, or connecting to Web addresses that display Web pages defined by any form of HTML. Instead, it can only connect to a dedicated gaming service that has been setup to communicate with the game console over the Internet and to facilitate multiplayer games by subscribers to the service who connect through game consoles that are registered with the gaming service. Each connection over the Internet is through a VPN tunnel, so that the communications between the game console and the gaming service are secure. The game console is not currently provided with a conventional keyboard, so that entry of text messages or other text input is possible only by selecting one alphanumeric character at a time from a display using one of the controllers. The game consoles do not have direct communication with parties outside of the secure online gaming environment (other than by a direct connection to another game console) for playing multiplayer games. Further, data controlled by the secure online gaming environment is not directly accessible to anyone who has not connected with the gaming environment using a game console. The present invention addresses this issue by providing access to secure data and services of the secure gaming environment through trusted partners for users of versatile computing devices who are not connected to the secure gaming environment through a game console.

Network System

Figure 3:
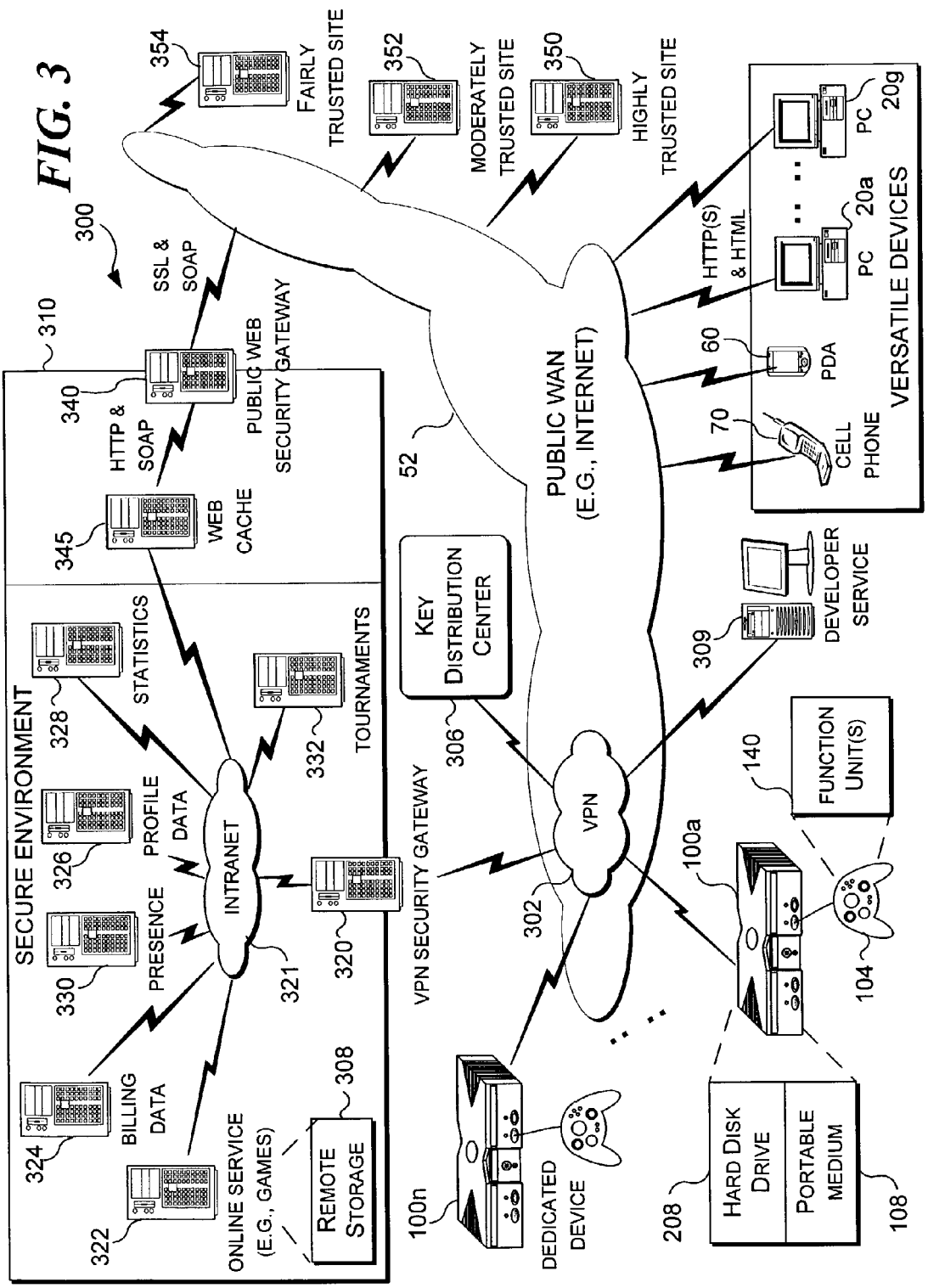
FIG. 3 shows an exemplary network environment that interconnects multiple dedicated gaming systems to a secure gaming environment via a virtual private network and interconnects versatile multi-purpose computing devices to the secure gaming environment via an insecure public network.

FIG. 3 shows an exemplary network gaming environment 300 that interconnects multiple dedicated gaming systems 100a, . . . 100n to each other and to a secure gaming environment 310, via a VPN 302. Those skilled in the art will recognize that secure gaming environment 310 can be for other purposes, such as a secure financial data environment, a secure insurance data environment, a secure industrial data environment, a secure shipping data environment, or other secure data environments that communicate with dedicated devices over a secure network. VPN 302 may be implemented with any of a variety of data communications systems and may employ an insecure public WAN 52 (e.g., the Internet), as well as private portions (e.g., a residential or commercial LAN). Also, VPN 302 may be implemented using any one or more of a variety of conventional communication configurations, including both wired and wireless types. Any of a variety of communications protocols can be used to communicate data via VPN 302, including both public and proprietary protocols. Examples of such protocols include TCP/IP, IPX/SPX, NetBEUI, etc. However, data communicated over VPN 302 is secured with at least one of a variety of encryption technologies such as Data Encryption Standard (DES), Kerberos, Pretty Good Privacy (PGP), etc.

Network gaming environment 300 also employs a key distribution center 306 that plays a role in authenticating individual players and/or gaming systems 100a . . . 100n for interconnection to one another, as well as to secure gaming environment 310. Distribution center 306 distributes keys and service tickets to valid participants, which may then be used to form game playing groups that include multiple players, or to purchase services from secure gaming environment 310. Network gaming environment 300 further includes a developer service 309 with which developers can produce media effects, updated media data, game code, and other services. Such services can be distributed between secure gaming environment 310 and the producers of games for the gaming systems, and between other devices within, and outside of Network gaming environment 300.

Dedicated gaming systems 100a, . . . 100n communicate with secure gaming environment 310 through a VPN security gateway 320, which is preferably a server that is generally configured much like PC 20 of FIG. 1. VPN security gateway 320 of FIG. 3 authenticates, encrypts, decrypts, and otherwise controls communications between gaming systems 100a, . . . 100n and services of secure gaming environment 310, which are preferably in communication with VPN security gateway 320 via an intranet 321. Secure gaming environment 310 provides various services for users of gaming systems 100a, . . . 100n, such as serving and/or hosting online games, serving downloadable music or video files, hosting gaming competitions, serving streaming audio/visual files, enabling exchange of email or other media communications, and the like. Secure gaming environment 310 also provides another memory source available to individual gaming systems 100a, . . . 100n, i.e., online storage. In addition to accessing data on optical storage disc 108, hard disk drive 208, and in MU(s), gaming system 100a can also access data files available at remote storage locations via VPN network 302, as exemplified by remote storage 308 at online service 322.

Users of dedicated gaming systems 100a, . . . 100n can also access and/or enter billing data 324, profile data 326 about themselves and lists of friends, game and user statistics 328, presence information 330 that indicates the status and communication accessibility of other users within secure gaming environment 310, information on game tournaments 332, and can access other services. However, accessing and entering such information through dedicated gaming systems 100a, . . . 100n is often cumbersome, because the corresponding user interfaces comprising the controllers supplied with the gaming systems are less capable than those of more versatile general computing devices, such as PC 20. For instance, as discussed above, it is more difficult to enter text through controller 104 than through a keyboard.

To improve data access and entry to secure environment 310, a public Web security gateway 340 is provided to enable more versatile computing devices, such as PCs, to communicate through insecure pubic WAN 52 to one or more authorized Web partners. Public Web security gateway 340 is a server configured much like PC 20, but includes one network interface to public WAN 52 and another network interface to a Web cache 345. Public Web security gateway authenticates requests for access to, or entry of secure data to databases within secure gaming environment 310. After authenticating a certificate from an authorized Web partner, public Web security gateway 340 relays a request to Web cache 345. Web cache 345 is in communication with intranet 321 and determines data access limitations based on the identity of the authorized Web partner and on the identity of the user making the request through the authorized Web partner. Web cache 345 also stores in memory a large amount of commonly requested secure data and recently requested secure data, thereby minimizing the load and data access delays imposed on secure gaming environment 310, and to enable it to carry out its primary purpose of providing services to dedicated gaming systems 100a, . . . 100n. To further enhance security, public Web security gateway 340 and Web cache 345 are preferably located in different physical locations than other devices of secure gaming environment 310. However, Web cache 345 communicates with the other devices of secure gaming environment 310 via dedicated secure communication lines.

Authorized Web partners obtain a digital certificate from secure gaming environment 310 or other trusted certificate authority sources, such as VERISIGN™, to enable bidirectional certificate authorization between Web partner Web sites and secure gaming environment 310. Users who are registered with an authorized Web partner can access and enter secure data within secure gaming environment 310 through the authorized Web partner's Web site with versatile computing devices such as PCs 20a-20n, a PDA 60, a cell phone 70, or other computing device that a user finds more convenient to use than a dedicated gaming device. Web sites of authorized Web partners can be assigned varying levels of authorization for corresponding levels of access to the secure data. For example, a highly trusted Web site 350 such as Microsoft Corporation's www.xbox.com, Web site, has a high level authorization, to enable registered users of that Web site to access secure data of Microsoft Corporation's XBOX LIVE™ secure gaming environment. An intermediate level authorization is provided to Web sites that are less closely related. For example, a moderately trusted Web site 352 such as a game publisher Web site, can be authorized to enable registered users of its Web site to access only that secure data of Microsoft Corporation's XBOX LIVE™ secure gaming environment that is related to games produced/published by the game publisher. Least authorized partner Web sites can be limited to accessing or modifying data that are considered public by the secure gaming environment. For example, registered users of a fairly trusted Web site 354 such as a fan club Web site, can be limited to accessing only leaderboard data. Further details regarding secure data access, entry, and other such functions are described below.

Exemplary Logic Processes

Figure 4:
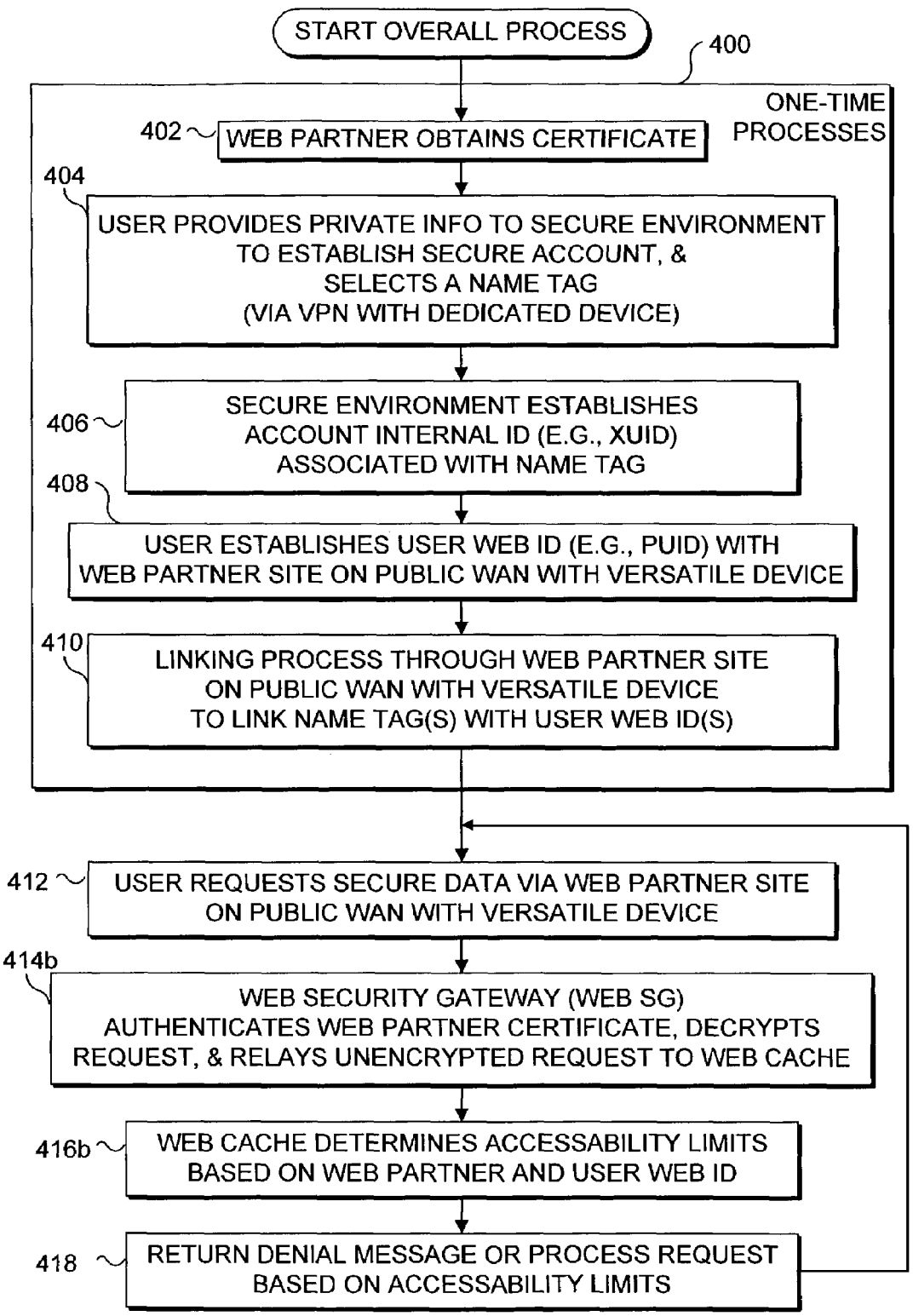
FIG. 4 is a flow diagram illustrating logic of an exemplary overall process of a preferred embodiment for controlling access to secure data and services within the secure gaming environment.

The following describes exemplary logic processes performed primarily by the Web cache and the public Web security gateway in communication with a Web partner Web site. FIG. 4 is a flow diagram illustrating logic of an exemplary overall process of a preferred embodiment for controlling access to secure data and services within the secure gaming environment. A set of one time processes 400 is performed to authenticate a Web partner and link a user's name tag used within the secure gaming environment to the user's identifier while connected to the Web partner's Web site. More specifically, at a step 402, a Web partner obtains a digital certificate from the operators of the secure environment or from a trusted third party. Preferably, the digital certificate comprises a public/private key certificate. This certificate will be used to authenticate requests originated from the Web partner's Web site.

At a step 404, a user, such as a game console player, establishes a secure account with the secure environment and supplies private information that is specific to the user. For example, the user can provide the secure environment with a credit card number, a bank number, or other billing information known privately by the user. In establishing the account, the user also selects a name tag, such as a gamer tag, that will identify the user to other users in the secure environment. Preferably, the user provides the private information and selects the name tag with the dedicated device in communication over the VPN to the secure environment. As indicated above, the dedicated device has limited capabilities, and the secure environment expects the user to use the dedicated device for interacting with primary services within the secure environment. Thus, for initial account setup, use of the secure network and dedicated device can provide a higher level of trust in the information provided and verify that the user has access to at least one dedicated device for primary interaction with the secure environment. For added security, the dedicated device can be serialized so that it is uniquely identifiable and can be verified as having an expected configuration for use in connecting securely with the secure environment.

After entering the private information and selecting a name tag, the secure environment establishes an account internal ID, at a step 406, which is associated with the selected name tag. The internal ID is preferably not known to the user, but rather is used as an internal identifier by the secure environment to correlate other information related to the user's selected name tag. Additional internal IDs can also be associated with the user's selected name tag and with a password selected by the user. For example, if a minor child establishes an account with the secure environment, a internal ID will be associated with the child's selected name tag. In addition, another internal ID will be established for a corresponding parent of the child. The child's internal ID can have a bit set to indicate that the child has limited access to secure data and services, while the parent's internal ID can be used to indicate full access to the secure data and services. However, both internal IDs are associated with the same name tag, so that the parent can control aspects of the child's use of the secure environment. Conversely, multiple name tags can be associated with a single internal ID (or multiple internal IDs). A internal ID can comprise an encoded form of the selected name tag, a sequential number, or any other unique and secure identifier such as Microsoft Corporation's XBOX™ universal ID (XUID).

Having established a secure account with the secure environment, the user also establishes a user Web ID by registering with a Web partner's Web site, at a step 408. In this case, the user accesses the Web partner's Web site with a versatile computing device via the public WAN, such as the Internet. The user Web ID associates the user with the Web partner's Web site, which is authorized with a certificate to communicate with the secure environment. This user Web ID is distinct from the internal ID that was established when the user obtained a secure account with the secure environment. The user Web ID is maintained by the Web partner's Web site and used to authenticate the user when the user communicates with the Web partner's Web site. The user's Web ID can also be associated with a particular authentication system that may be used by more than one Web partner Web site. For example, if a Web partner's Web site uses a well-known authentication system, such as Microsoft Corporation's PASSPORT™ authentication system, the same user Web ID can be used to access the secure environment through each Web partner Web site that relies upon the same user authentication system. The user authentication system is identified as a credential type. The credential type is associated with the user's Web ID in any communication between a Web partner Web site and the secure environment. Thus, the same user Web ID, such as a single PASSPORT™ unique ID (PUID), can be used with multiple Web partner Web sites that rely upon the same user authentication system. Web partner Web sites that use a different user authentication system will be identified by a different credential type.

At a step 410, the user initiates a linking process through an authorized Web partner's Web site to link the user's Web ID(s) to the user's name tag(s) and corresponding internal ID(s). This linking process is performed for each user Web ID that has a unique credential type. Thus, the linking process need not occur for each Web partner Web site if the Web partner Web sites use the same user authentication system (i.e., have the same credential type). The linking process is performed by the Web cache, so that the secure environment can correlate external user Web IDs with internal name tags and internal IDs. Further details regarding this linking process are described below with regard to FIG. 5.

Having established a link between an external user Web ID and an internal name tag and internal ID, the user can access and enter data to the secure environment with a versatile computing device through a Web partner Web site over the public WAN. At a step 412, the user requests a service related to secure data via the Web partner's Web site. Communication between the user's versatile computing device and the Web partner's Web site can be a secure or an insecure communication, but the user must have been authenticated by the Web partner's Web site. The Web partner's Web site preferably sends the user's request to the public Web security gateway as an encrypted simple object access protocol (SOAP) message. SSL communication is used to send the encrypted SOAP request to the public Web's security gateway along with the Web partner's certificate, the user Web ID, and any other data provided with the request. At a step 414*b*, the public Web security gateway authenticates the Web partner's certificate, decrypts the request, and relays the unencrypted request to the Web cache. Further details regarding step 414*b* are described below with regard to FIG. 6.

At a step 416*b*, the Web cache determines data accessibility limits based on the sending Web partner and the user Web ID. At a step 418, the Web cache either returns a denial message or processes the request based on the accessibility limits. For example, as suggested above, the Web cache may return public leaderboard information to a Web user that is not registered with the secure environment as long as the Web user submitted a request for the public information from at least a minimally authorized Web partner's Web site. Conversely, the Web cache can return detailed billing information if the Web user is a registered user of the secure environment and submitted the request from at least a minimally authorized Web partner. Return communication goes through the public Web security gateway according to bidirectional certificate authorization with the Web partner Web site. Further details regarding determining data accessibility limits and processing requests are described below with regard to FIG. 7.

Figure 5:
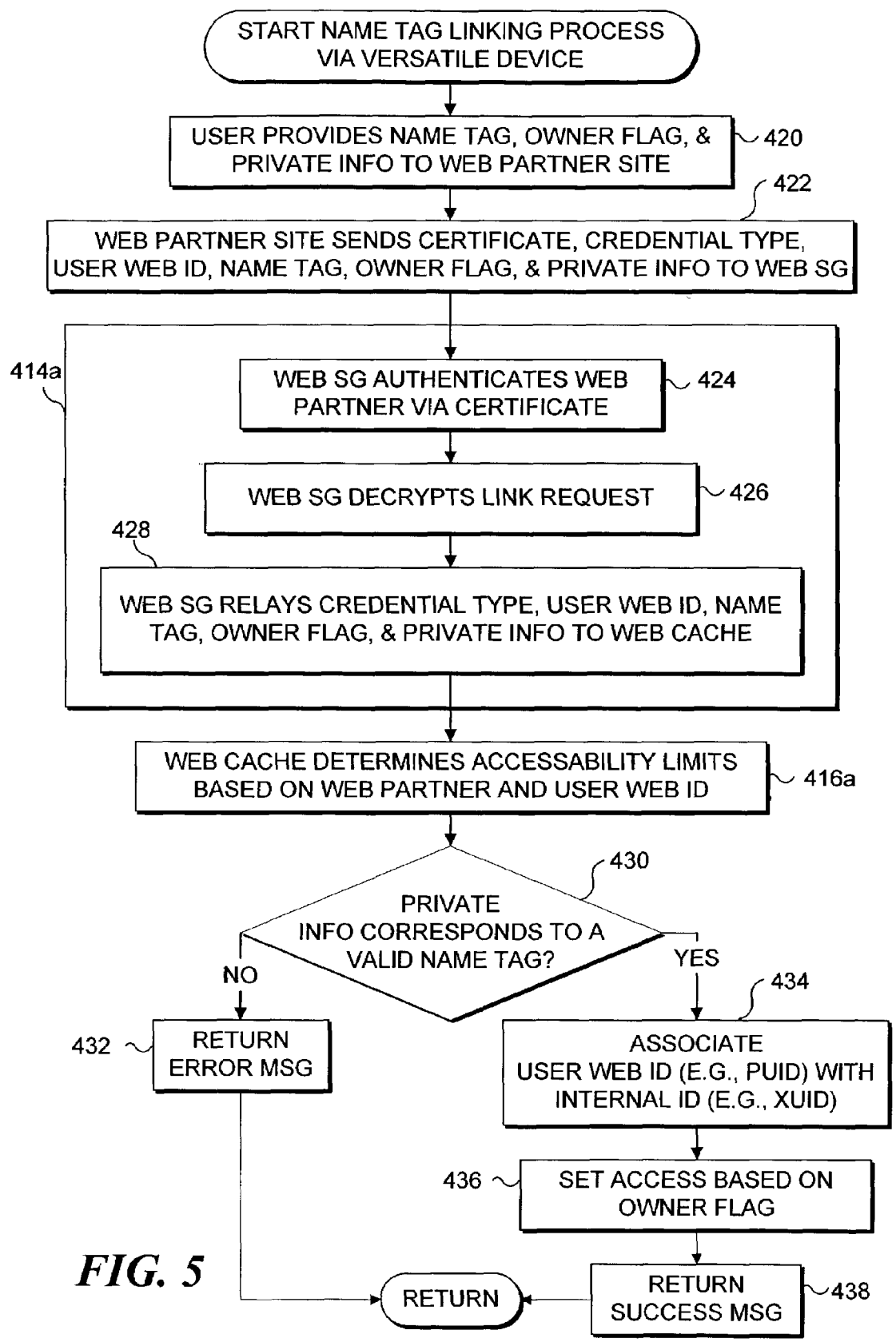
FIG. 5 is a flow diagram illustrating logic for linking a user Web identifier (ID) with a name tag (and corresponding internal ID) used in the secure environment.

FIG. 5 is a flow diagram illustrating logic for linking a user Web ID with a name tag (and corresponding internal ID) used in the secure environment. The logic described below provides an example of linking a single user Web ID with a single name tag. However, as discussed above, multiple user Web IDs can be linked with multiple name tags. Recall also that the linking process can be performed one time for each unique credential type so that the same user Web ID can be used at multiple Web partner Web sites. Having established a Web user ID through a Web partner Web site, the user provides a name tag, an account owner indication, and private information to the Web partner Web site, at a step 420. The account owner indication is a flag that indicates whether the user has full access rights to the user's account in the secure environment (e.g., parent or manager), or only limited access rights (e.g., child or employee). At least while the user provides private information to the Web partner Web site, the communication between the user's versatile computing device and the Web partner Web site is preferably encrypted and protected under SSL protocols. At a step 422, the Web partner Web site sends the private information, the owner flag, the selected name tag, the user's Web ID, the credential type, and the Web partner's certificate to the public Web security gateway via an SSL communication. The above information is preferably incorporated in a SOAP request to link the user's Web ID with the name tag.

At a step 414*a*, the public Web security gateway performs authentication and decryption steps before relaying the linking request to the Web cache. More specifically, at a step 424, the public Web security gateway authenticates the Web partner based on the certificate. If the request was submitted by an unauthorized Web partner, the public Web security gateway denies a connection to the public Web security gateway. However, if the linking request was submitted from an authorized Web partner Web site, the public Web security gateway decrypts the link request at a step 426. Further details regarding the decrypting step are described below with regard to FIG. 6. At a step 428, the public Web security gateway relays the decrypted request along with the credential type, user Web ID, name tag, owner flag, and private information to the Web cache. The above three steps are generally performed on any request that is submitted, including the linking request.

At a step 416*a*, the Web cache determines data accessibility limits based on the user Web ID and Web partner. At a decision step 430, the Web cache determines whether the submitted private information corresponds to a valid name tag previously registered in the secure environment. If the private information does not correspond to a valid name tag, the Web cache returns an error message, at a step 432. If a match is found with a valid name tag in the secure environment, the Web cache associates the user Web ID with the internal ID corresponding to the valid name tag, at a step 434. At a step 436, the Web cache sets access limitations based on the owner flag and/or other attributes associated with the name tag, such as whether the name tag is currently sanctioned in some way. Access limitations based on the Web partner are set separately when the Web partner obtains a certificate. At a step 438, the Web cache returns a message indicating a successful link.

Figure 6:
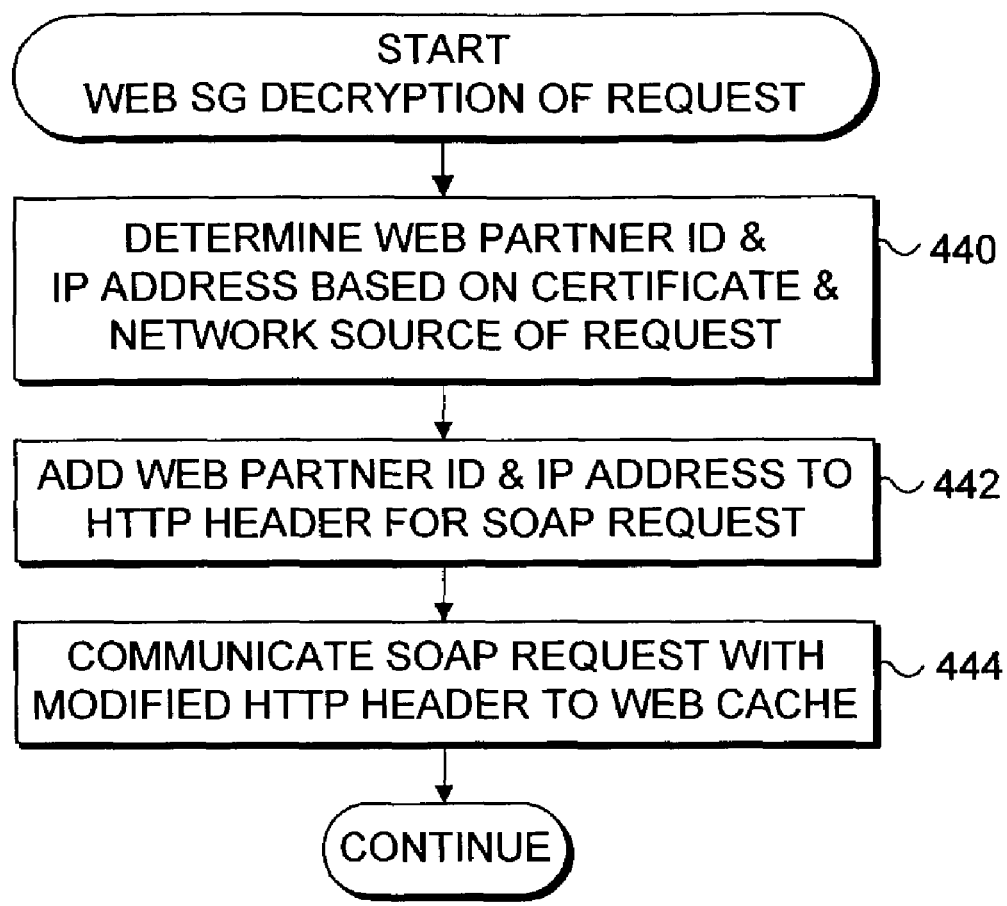
FIG. 6 is a flow diagram illustrating further detailed logic for decrypting and communicating a request for service over an insecure communication channel within the secure environment.

FIG. 6 is a flow diagram illustrating further detailed logic for decrypting and communicating a request for service within the secure environment, over an insecure communication channel. At a step 440, the public Web security gateway determines a Web partner ID and an Internet protocol (IP) address (and port) based on the certificate and network source of the received request. Determination of this data is a by-product of the standard authentication process using the certificate for the SSL connection. At a step 442, the public Web security gateway adds the Web partner ID and IP address (and optionally the port) to a HTTP header for the received SOAP request. At a step 444, the public Web security gateway communicates the SOAP request with the modified HTTP header to the Web cache. The SOAP request and modified header are communicated without SSL encryption through a network interface from the public Web security gateway to the Web cache. As indicated above, the SOAP request includes the user Web ID and other data needed for the corresponding request.

Figure 7:
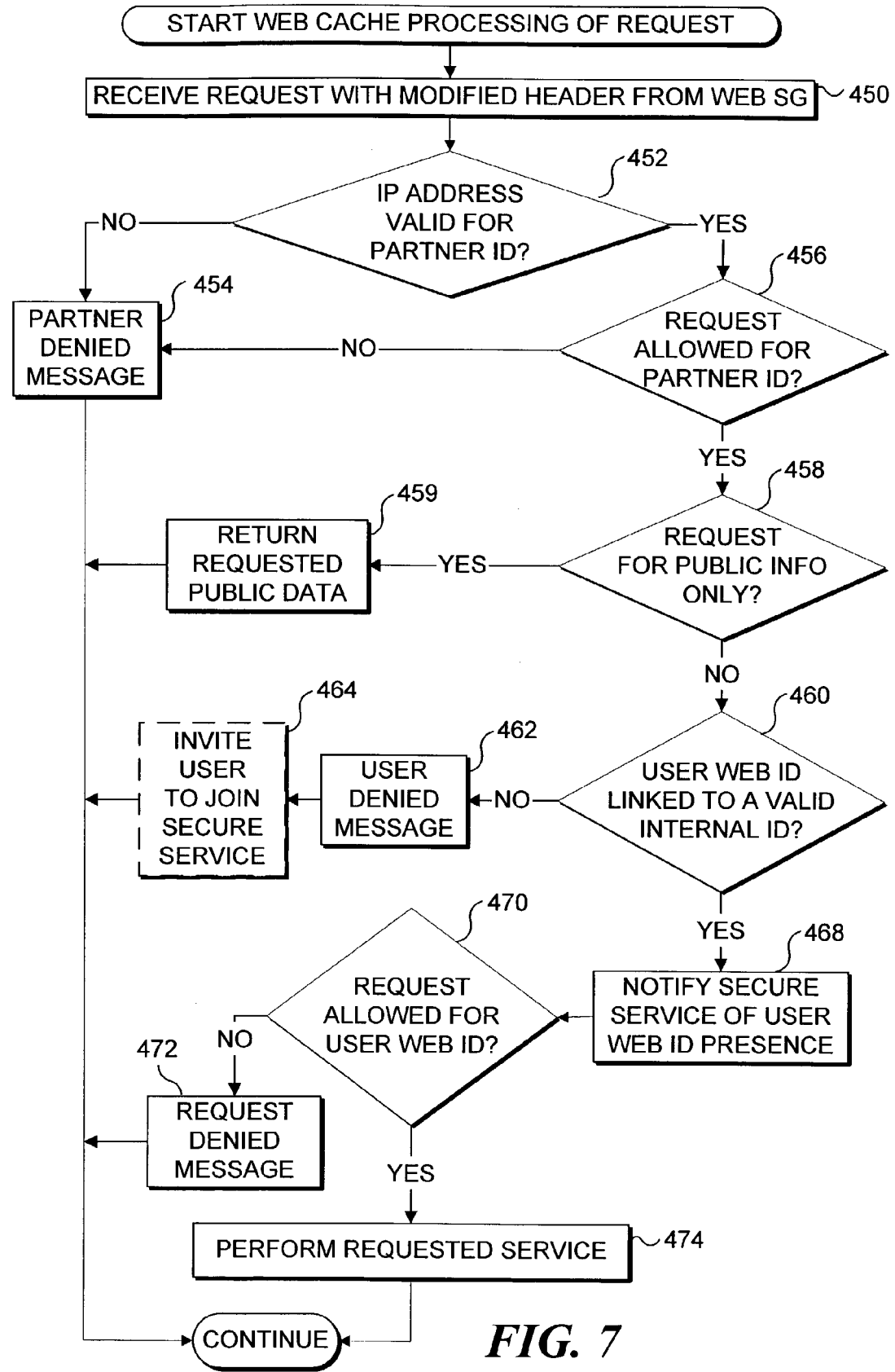
FIG. 7 is a flow diagram illustrating further detailed logic carried out by a Web cache to determine access limitations and process a request.

FIG. 7 is a flow diagram illustrating further detailed logic carried out by the Web cache to process a request. At a step 450, the Web cache receives the request with the modified header from the public Web security gateway. At a decision step 452, the Web cache determines whether the IP address included in the modified header corresponds to the IP address expected from the corresponding Web partner, as identified by the partner ID. Preferably, when the Web partner obtains a certificate, the Web partner notifies the secure environment of the IP address from which to expect communication from the Web partner's Web site. If the IP address received in the modified header does not match that expected for the partner ID, a "partner denied" message is returned, at a step 454. This step could also include returning an invitation to the Web partner to register for, or correct, the certificate, or to carry out other error processing. Control then returns to a controlling module of the Web cache or servicing of the current request simply ends. However, if the IP address is valid for the partner ID, the Web cache determines, at a decision step 456, whether the request is allowed for the corresponding partner ID. For example, the partner ID can identify a Web partner that is limited to requesting only certain application programming interfaces (APIs). This decision step can further limit access to only secure data that are related to particular game titles associated with the Web partner, if the request was for information related to game titles. Requests for secure information related only to the user (e.g., billing information) is not limited at this point. If the request is not allowed for the partner ID, the partner denied message is issued at step 454. However, if the Web partner is allowed to submit the request, the Web cache determines, at a decision step 458, whether the request was for only information that is considered public by the secure environment. If the request is only for public information, the requested public data are returned at a step 459, and control returns to a controlling module or servicing ends.

For more privately held data, the Web cache determines, at a decision step 460, whether the user Web ID is linked to a valid internal ID (and/or a corresponding name tag). If the Web ID is not valid or the internal ID is not valid, indicating that a link was not previously defined, the Web cache returns a "user denied" message at a step 462. The Web cache can optionally also invite the user to join the secure environment or recommend other courses of action, at a step 464. However, if a valid user Web ID is linked to a valid internal ID, the Web cache notifies the secure environment of the user Web ID's presence, at a step 468. This notification enables the secure environment to determine associated internal IDs of users who may be listed as friends or have other relationships to the user corresponding to the user Web ID. For example, the friends can be notified of the user's current communication with the secure environment via an instant message, audio indicator, visual indicator, or other indicator. Those skilled in the art will recognize that other automated processes can be performed by the secure environment when the user's presence is detected.

At a decision step 470, the Web cache determines whether the submitted request is allowed for the corresponding user Web ID. If the user Web ID is prohibited from making the submitted request, the Web cache issues a "request denied" message at a step 472. For example, parental controls, current penalties associated with the internal ID, or other limitations may be in force, prohibiting the secure environment from satisfying the request for the user. However, if the request is allowed for the user Web ID, the Web cache initiates the corresponding process to perform the requested service or access the requested data, at a step 474. For example, the Web cache may launch an API that shows waiting messages, an API that shows billing information, an API that enables the user to set up a game tournament, an API that enables the user to download replays or upgraded game modules, an API that accesses the user's friends list, an API that enables the user to manage a team, or APIs that enable the user to obtain a variety of other services. Many of these APIs involve transforming and/or formatting secure data for display in a Web page rendered by a browser executing on a versatile computing device. Some examples of theses services are described below. Once the requested service is initiated, or one of the denied messages is issued, control returns to the controlling module to await another request, or simply ends.

Exemplary Services

FIG. 8A (prior art) is a screen shot of a scoreboard display 500 produced by a dedicated gaming device. Scoreboard display 500 provides performance data for a selected game 502. For example, race time data 504 are listed in ascending order from a shortest race time to a longest race time for seven players of game 502. Corresponding name tags 506 indicate the player who has achieved each race time. Additional data can be obtained with the controller of the dedicated game device, but the additional data can be cumbersome to access if input of more than a few alphanumeric characters is required to do so.

Figure 8B:
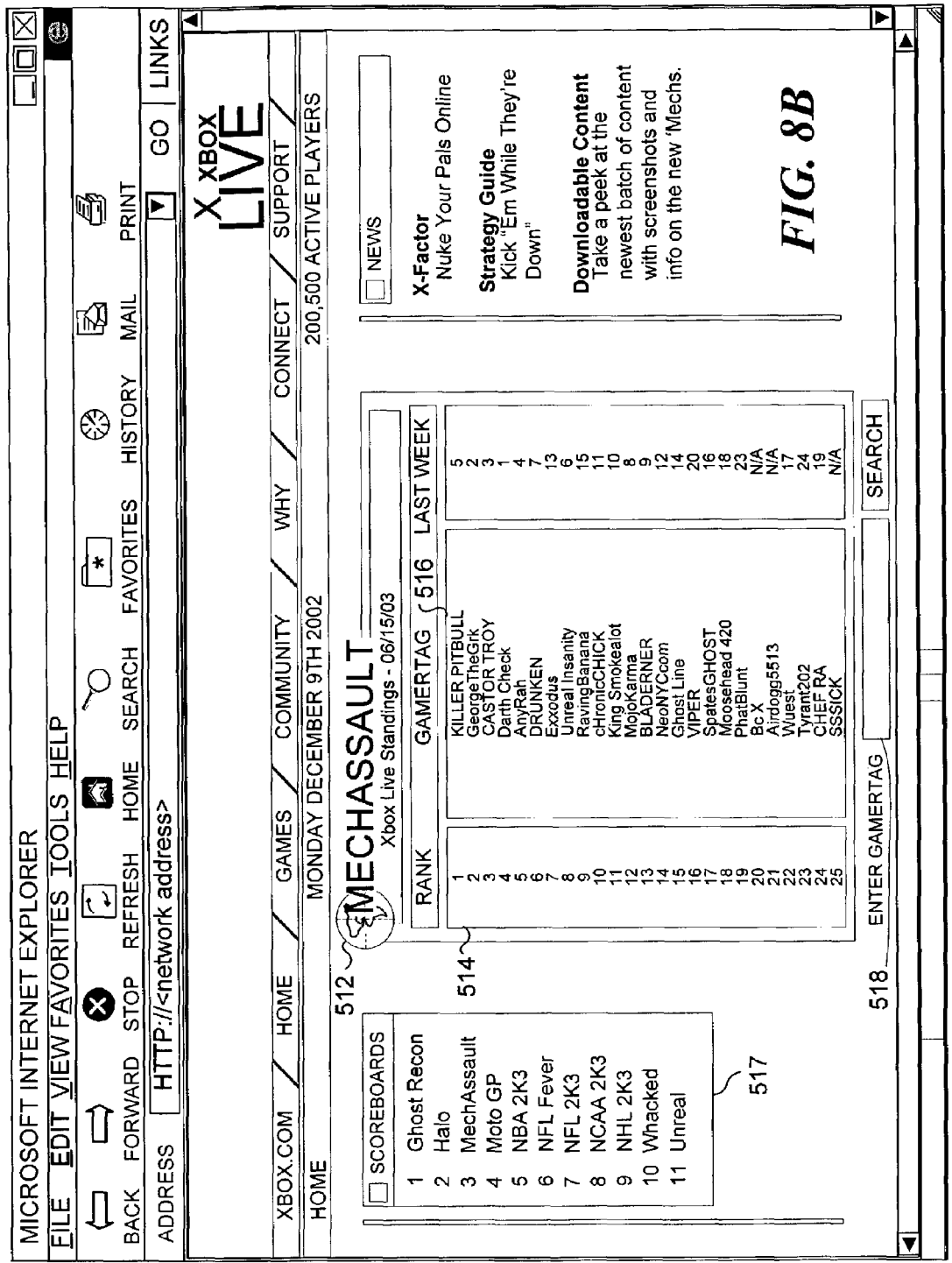
FIG. 8B is a screen shot of a leaderboard display that is rendered in a Web browser by a versatile computing device, such as a PC.

FIG. 8B is a screen shot of a leaderboard display 510 that is rendered in a Web browser by a versatile computing device, such as a PC. Leaderboard display 510 also identifies the game 512 and a ranking 514 of users by name tag 516. However, leaderboard display 510 also includes an easily selectable list of multiple games 517 on which a Web user can simply click to access rankings for a newly selected game. Leaderboard display 510 also includes a gamer tag entry field 518 that enables the Web user to enter a specific gamer tag and request a current ranking of the user associated with the entered gamer tag. Entering such information with a conventional keyboard into a Web page rendered on a virtual computing device is much more convenient than entering the information with the controller of the dedicated gaming device.

Figure 9A:
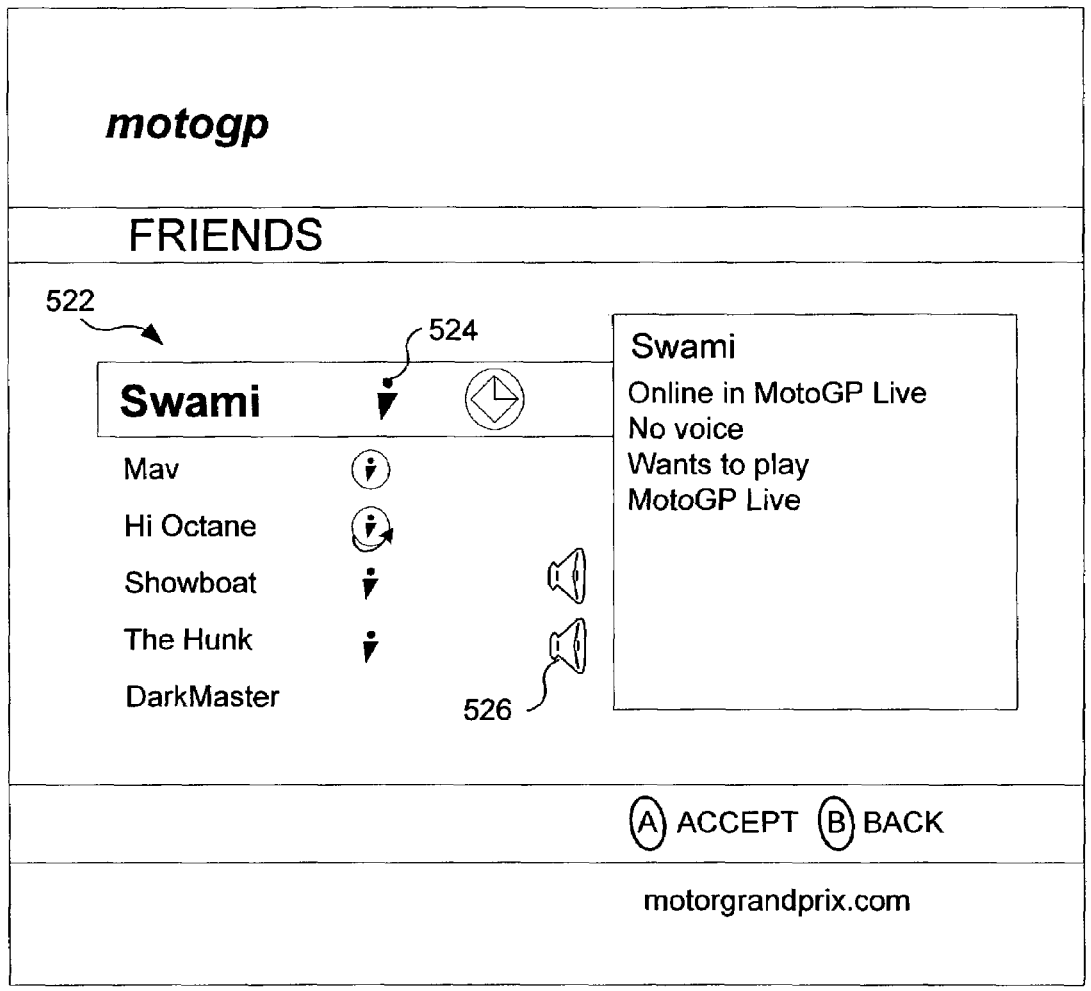
FIG. 9A (Prior Art) is a screen shot of a list of friends produced by the dedicated gaming device.

FIG. 9A (prior art) is another example of a display produced by the dedicated gaming device. Specifically, FIG. 9A is a screen shot of a list friends display 520 produced by the dedicated gaming device. A list of friends 522 is shown along with a corresponding presence indicator 524 that indicates whether each friend is currently active (i.e., logged on) in the secure gaming environment. Friends display 520 also includes a voice indicator 526 for those friends that have voice communication capability through the dedicated gaming device.

Figure 9B:
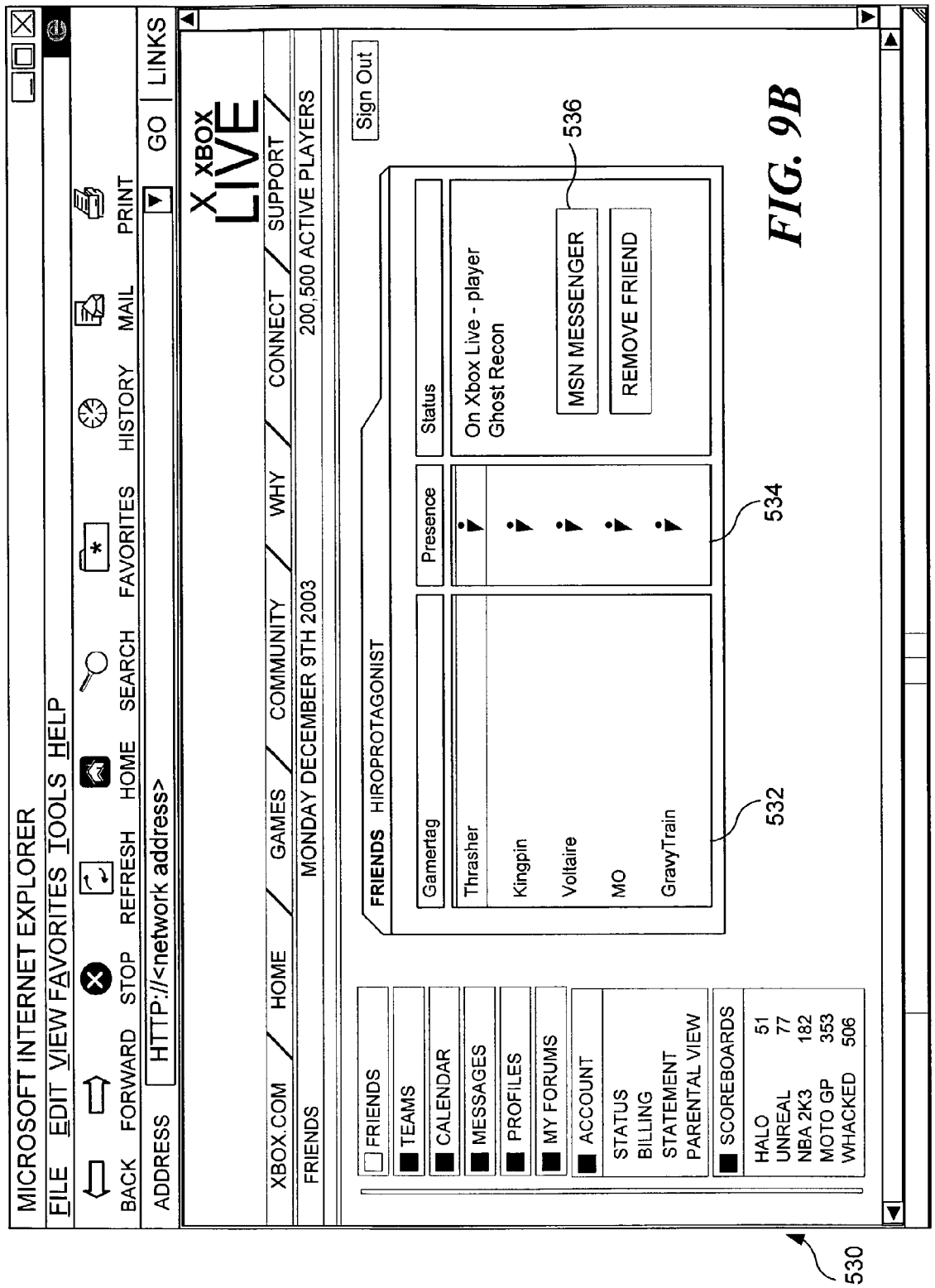
FIG. 9B is a screen shot of a Web page listing friends, which is rendered in a Web browser running on a versatile computing device.

FIG. 9B is a screen shot of a friends page 530 that is rendered in a Web browser running on a versatile computing device. Friends page 530 displays similar information, such as a list of friends 532 and a corresponding presence indicator 534. However, friend's page 530 also includes an instant messenger button 536 that a Web user can select to type and send a text message to a selected friend that is currently communicating with the secure environment either through a dedicated device or a versatile computing device. Such text messaging is too cumbersome to be viable with the controller of the dedicated gaming device, but is very convenient with the keyboard of the versatile computing device. Friends page 530 can also be easily modified to enable other functions, such as initiating a voice over IP (VOIP) call to a selected friend.

Figure 10A:
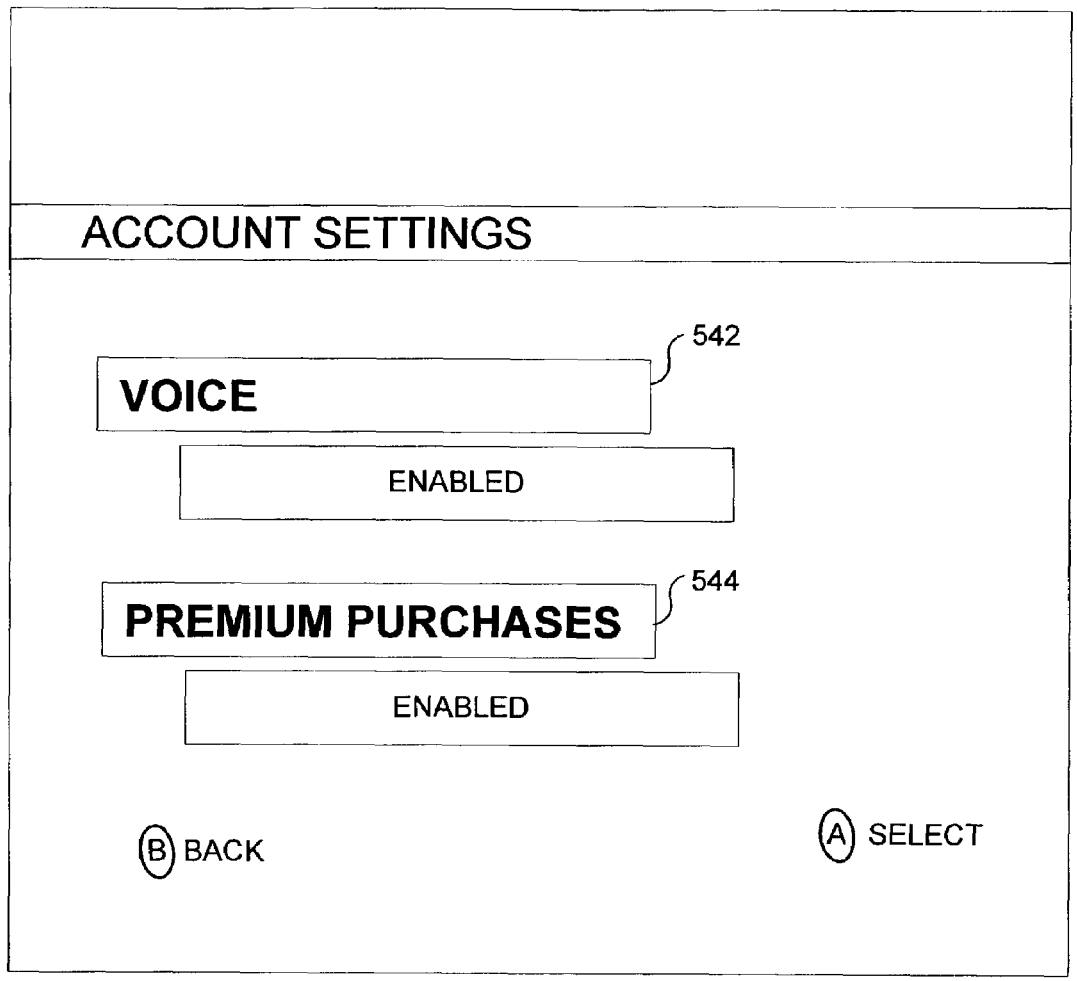
FIG. 10A (Prior Art) is a screen shot of an account settings display produced by the dedicated gaming device.

FIG. 10A (prior art) is a screen shot of an account settings display 540 produced by the dedicated gaming device. Account settings display 540 illustrates access limitations that can be controlled by the account owner, such as a parent. For example, a voice setting 542 can be disabled by a parent so that a child does not engage in voice communication through the dedicated gaming device with other users of the services in the secure environment. Similarly, an account owner can specify whether a premium purchases setting 544 is enabled to permit the child to download game modules or other data from within the secure environment.

Figure 10B:
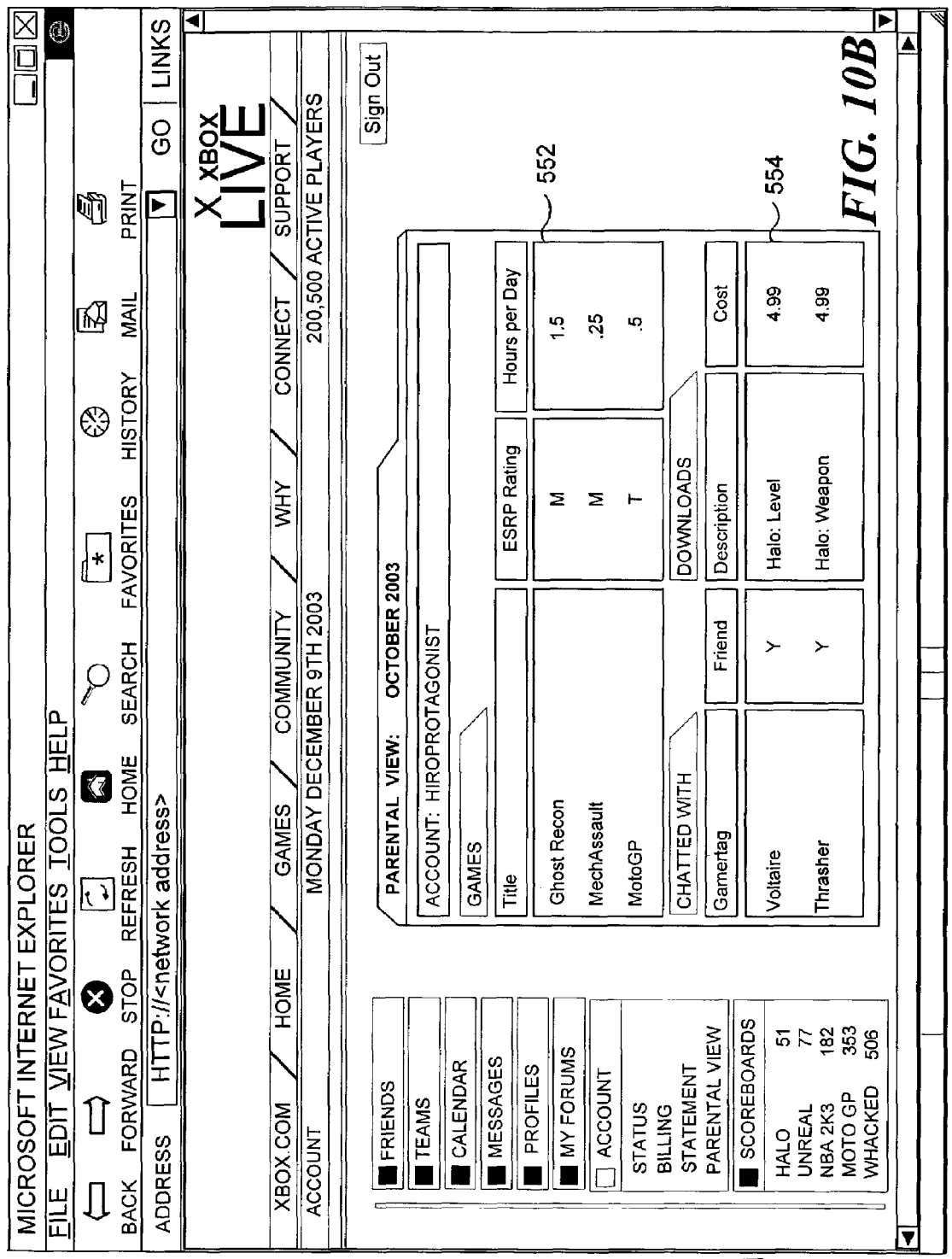
FIG. 10B is a screen shot of a parental view Web page rendered in a Web browser executing on a versatile computing device.

FIG. 10B is a screen shot of a parental view page 550 rendered in a Web browser executing on a versatile computing device. As shown, more detailed information is provided regarding limitations and actions of a child user. For example, a parent can easily review and enter a limitation on a number of hours 552 (e.g., per day or week) that the child is permitted to play a given game. The parent can also easily review current download expenditures 554 incurred by the child and/or set limits on such expenditures. A further significant benefit of interfacing with the secure environment through a browser running on a versatile computing device is that such versatile computing devices are widely available both at home and in offices, where a parent can more easily monitor a child's game activities.

Although the present invention has been described in connection with the preferred form of practicing it and modifications thereto, those of ordinary skill in the art will understand that many other modifications can be made to the present invention within the scope of the claims that follow. For example, the public Web security gateway and the Web cache can comprise a single computing device or multiple computing devices. Accordingly, it is not intended that the scope of the invention in any way be limited by the above description, but instead be determined entirely by reference to the claims that follow.

The invention in which an exclusive right is claimed is defined by the following:

1. A method for controlling access to a secure data service within a secure data service environment, said access being requested by a user of a versatile computing device that is not dedicated to communicating with the secure data service environment over a secure private communication network, so that the access is outside of the secure data service environment and is over an insecure public network, wherein the secure data service environment provides online data and services to dedicated devices through the secure private communication network, the method comprising the steps of:
   (a) linking a user-partner identifier with a user-service identifier, wherein:
      (i) the user-partner identifier is used to authenticate the user with a partner network service that has been previously certified by the secure data service environment and that is in communication with the versatile computing device, the user-partner identifier being used by the versatile computing device and partner network service to authenticate the user with the secure data service environment through the insecure public network; and
      (ii) the user-service identifier is used to authenticate the user with the secure data service environment that provides the online service to the dedicated devices through the secure private communication network without passing through any partner network service, the dedicated devices being distinguished from versatile devices which communicate with the partner network service through the insecure public network in that dedicated devices are dedicated to a primary function;
   (b) determining whether a request for access to the secure data service within the secure data service environment is authentic when the request for access is received from the partner network service on behalf of the user of the versatile computing device; and
   (c) providing the requested access to the secure data service over the insecure public network to the partner network service, and thus to the versatile computing device over the insecure public network, if the request is authentic.

2. The method of claim 1, wherein a person participating within the secure data service environment communicates through a secure gateway that only permits the dedicated device employed by the person to access the secure data service environment, said secure gateway being inaccessible by a user communicating through the versatile computing device, over the insecure public network, from outside of the secure data service environment.

3. The method of claim 1, wherein the method further comprises, prior to providing access to the requested secure data service, the step of determining access limits associated with at least one of the partner network service, the user-partner identifier, and the user-service identifier.

4. The method of claim 1, wherein the secure data service environment comprises a secure gaming environment providing online gaming data and services to the dedicated devices through the secure private communication network.

5. The method of claim 1, wherein the secure private communication network comprises a virtual private network.

6. The method of claim 1, wherein the partner network service is accessed through a Web site that issues the user-partner identifier.

7. The method of claim 1, wherein the step of linking comprises the steps of:
   (a) receiving the user-partner identifier, the user-service identifier, and private information from the partner network service, wherein the private information is unique to the user;
   (b) determining whether the private information matches corresponding private information stored within the secure data service environment, wherein the corresponding private information stored within the secure data service environment is associated with the user-service identifier; and
   (c) associating the user-partner identifier with the user-service identifier if the private information matches the corresponding private information stored within the secure data service environment.

8. The method of claim 6, further comprising the step of associating a credential type with the user-partner identifier, wherein the credential type indicates a user authentication system, thereby enabling the user to access the secure data service with the user-partner identifier through any partner network service that uses a common user authentication system.

9. The method of claim 1, wherein the method further comprises, prior to the step of linking, the step of issuing the partner network service a certificate that authenticates the partner network service, to enable communication with the secure data service environment.

10. The method of claim 9, wherein the step of determining whether the request received from the partner network service is authentic comprises the steps of:
   (a) receiving the certificate from the partner network service along with the request;
   (b) determining whether a public key of the certificate corresponds to a private key associated with the partner network service;
   (c) denying access to the secure data service if the public key of the certificate does not corresponds to the private key; and
   (d) enabling access to the secure data service if the public key of the certificate corresponds to the private key.

11. The method of claim 9, further comprising the step of decrypting the request received from the partner network service on behalf of the user of the computing device for access to the secure data service from within the secure data service environment.

12. The method of claim 11, wherein the step of decrypting comprises the steps of:
   (a) determining at least one of:
      (i) a partner identifier as a function of the certificate; and
      (ii) a communication source identifier as a function of a network communication source of the request;
   (b) adding at least one of the partner identifier and the communication source identifier to a header of the request, forming a modified request; and
   (c) communicating the modified request through an insecure public communication channel to a service module for providing the requested secure data service.

13. The method of claim 1, wherein the step of providing the requested access to the secure data service comprises the steps of:
   (a) determining whether the requested access to the secure data service is available, using a Web cache module;

(b) providing the requested access to the secure data service with the Web cache, if the requested access to the secure data service is available from the Web cache; and otherwise (c) accessing a core portion of the secure data service environment to provide the requested access to the secure data service, wherein the core portion has a primary function of providing secure data services to the dedicated devices through the secure private communication network.

14. The method of claim 1, wherein the secure data service comprises at least one of:

(a) a leaderboard secure data service that selectively provides current information regarding performance of users of the secure data environment;

(b) a statistics secure data service that selectively provides current information regarding usage of at least one service within the secure data environment;

(c) a friends list secure data service that selectively provides current status regarding users associated with the user of the versatile computing device, and provides services for at least one of viewing, adding, deleting, modifying, and communicating with users associated with the user of the versatile computing device;

(d) an account status secure data service that provides current information regarding an account with the secure data environment, and provides services for at least one of viewing, adding, deleting, and modifying parameters of the account with the secure data environment;

(e) a tournaments secure data service that selectively provides current information regarding a tournament hosted by the secure data environment, and provides services for at least one of viewing, adding, deleting, and modifying parameters of the tournament hosted by the secure data environment;

(f) a team management secure data service that selectively provides current information regarding a team of users of the secure data environment, and provides services for at least one of viewing, adding, deleting, and modifying parameters relating to the team of users of the secure data environment;

(g) a user control secure data service that selectively provides current information regarding a limited user of the secure data environment, and provides services for at least one of viewing, adding, deleting, and modifying limits controlling use and access by the limited user of the secure data environment;

(h) a messaging secure data service that selectively provides current information regarding messages associated with the secure data environment that are available to the user of the computing device, and provides messaging services for the user of the computing device to communicate with other users who are within the secure data environment; and (i) a download secure data service that selectively provides current information regarding secure data and execution modules retrieved from the secure data environment, and provides services for viewing and selectively retrieving secure data and execution modules from the secure data environment.

15. The method of claim 1, further comprising the step of formatting secure data accessed in response to the requested access to the secure data service, wherein the formatting conforms to standard specifications of a markup language for transferring formatted data to a partner network service.

16. The method of claim 1, further comprising the step of formatting secure data accessed in response to the requested access to the secure data service, wherein the formatting conforms to standard specifications of a markup language for displaying the secure data in a Web page rendered by a Web browser executed by the computing device.

17. A memory medium on which are stored machine instructions for carrying out the steps of claim 1.

18. A system for controlling access to a secure data service within a secure data service environment, said access being requested by a user of a versatile computing device that is outside the secure data service environment and that communicates with the secure data service environment through an insecure public network, wherein the secure data service environment provides online data and services to dedicated devices that communicate through a secure private communication network, the system comprising:

(a) a processor;

(b) a network communication interface coupled to the processor for communicating with a partner network service through the insecure public network, said partner network service communicating with the versatile computing device through the insecure public network;

(c) a secure communication interface coupled to the processor for communicating with the secure data service environment that provides online data and services to the dedicated devices through the secure private communication network, the dedicated devices being distinguished from the versatile computing devices in that dedicated devices are dedicated to a primary function; and (d) a memory coupled to the processor and storing a plurality of machine instructions that cause the processor to carry out a plurality of functions, including:

(i) linking a user-partner identifier with a user-service identifier, wherein:

(A) the user-partner identifier is used to authenticate the user with a partner network service that has been previously certified by the secure data service environment and that is in communication with the versatile computing device, the user-partner identifier being used by the versatile computing device and partner network service to authenticate the user with the secure data service environment through the insecure public network; and (B) the user-service identifier is used to authenticate the user with the secure data service environment that provides the online service to the dedicated devices through the secure private communication network and without passing through any partner network service;

(ii) determining whether a request for access to the secure data service within the secure data service environment is authentic when the request for access is received from the partner network service on behalf of the user of the versatile computing device; and (iii) providing the requested access to the secure data service over the insecure public network to the partner network service, and thus to the versatile computing device over the insecure public network, if the request is authentic.

19. The system of claim 18, wherein a person participating within the secure data service environment communicates through a secure gateway that only permits the dedicated device employed by the person to access the secure data service environment, said secure gateway being inaccessible by a user communicating through the versatile computing device, over the insecure public network, from outside of the secure data service environment.

20. The system of claim 18, wherein prior to providing access to the requested secure data service, the machine instructions further cause the processor to carry out the function of determining access limits associated with at least one of the partner network service, the user-partner identifier, and the user-service identifier.

21. The system of claim 18, wherein the secure data service environment comprises a secure gaming environment providing online gaming data and services to the dedicated devices through the secure private communication network.

22. The system of claim 18, wherein the secure private communication network comprises a virtual private network.

23. The system of claim 18, wherein the partner network service is accessed through a Web site that issues the user-partner identifier.

24. The system of claim 18, wherein the machine instructions further cause the processor to carry out the functions of:
(a) receiving the user-partner identifier, the user-service identifier, and private information from the partner network service, wherein the private information is unique to the user;
(b) determining whether the private information matches corresponding private information stored within the secure data service environment, wherein the corresponding private information stored within the secure data service environment is associated with the user-service identifier; and
(c) associating the user-partner identifier with the user-service identifier if the private information matches the corresponding private information stored within the secure data service environment.

25. The system of claim 23, wherein the machine instructions further cause the processor to carry out the function of associating a credential type with the user-partner identifier, wherein the credential type indicates a user authentication system, thereby enabling the user to access the secure data service with the user-partner identifier through any partner network service that uses a common user authentication system.

26. The system of claim 18, wherein prior to the function of linking, the machine instructions further cause the processor to carry out the function of issuing the partner network service a certificate that authenticates the partner network service to enable communication with the secure data service environment.

27. The system of claim 26, wherein the machine instructions further cause the processor to carry out the functions of:
(a) receiving the certificate from the partner network service along with the request;
(b) determining whether a public key of the certificate corresponds to a private key associated with the partner network service;
(c) denying access to the secure data service if the public key of the certificate does not correspond to the private key; and
(d) enabling access to the secure data service if the public key of the certificate corresponds to the private key.

28. The system of claim 26, wherein the machine instructions further cause the processor to carry out the function of decrypting the request received from the partner network service on behalf of the user of the versatile computing device for access to the secure data service from within the secure data service environment.

29. The system of claim 28, wherein the machine instructions further cause the processor to carry out the functions of:
(a) determining at least one of:
(i) a partner identifier as a function of the certificate; and
(ii) a communication port identifier as a function of a network communication source of the request;
(b) adding at least one of the partner identifier and the communication port identifier to a header of the request, forming a modified request; and
(c) communicating the modified request through an insecure public communication channel to a Web cache module for providing the requested secure data service.

30. The system of claim 18, wherein the machine instructions further cause the processor to carry out the functions of:
(a) determining whether the requested access to the secure data service is available, using a Web cache module;
(b) providing the requested access to the secure data service with the Web cache, if the requested access to the secure data service is available from the Web cache; and otherwise
(c) accessing a core portion of the secure data service environment to provide the requested access to the secure data service, wherein the core portion has a primary function of providing secure data services to the dedicated devices through the secure private communication network.

31. The system of claim 18, wherein the secure data service comprises at least one of:
(a) a leaderboard secure data service that selectively provides current information regarding performance of users of the secure data environment;
(b) a statistics secure data service that selectively provides current information regarding usage of the secure data environment;
(c) a friends list secure data service that selectively provides current status regarding users associated with the user of the versatile computing device, and provides services for at least one of viewing, adding, deleting, modifying, and communicating with users associated with the user of the versatile computing device;
(d) an account status secure data service that provides current information regarding an account with the secure data environment, and provides services for at least one of viewing, adding, deleting, and modifying parameters of the account with the secure data environment;
(e) a tournaments secure data service that selectively provides current information regarding a tournament hosted by the secure data environment, and provides services for at least one of viewing, adding, deleting, and modifying parameters of the tournament hosted by the secure data environment;
(f) a team management secure data service that selectively provides current information regarding a team of users of the secure data environment, and provides services for at least one of viewing, adding, deleting, and modifying parameters relating to the team of users of the secure data environment;
(g) a user control secure data service that selectively provides current information regarding a limited user of the secure data environment, and provides services for at least one of viewing, adding, deleting, and modifying limits controlling use and access by the limited user of the secure data environment;
(h) a messaging secure data service that selectively provides current information regarding messages associated with the secure data environment that are available to the user of the computing device, and provides messaging services for the user of the computing device to communicate with other users who are within the secure data environment; and (i) a download secure data service that selectively provides current information regarding secure data and execution modules retrieved from the secure data environment, and provides services for viewing and selectively retrieving secure data and execution modules from the secure data environment.

32. The system of claim 18, wherein the machine instructions further cause the processor to carry out the function of formatting secure data accessed in response to the requested access to the secure data service, wherein the formatting conforms to standard specifications of a markup language for transferring formatted data to a partner network service.

33. The system of claim 18, further comprising the step of formatting secure data accessed in response to the requested access to the secure data service, wherein the formatting conforms to standard specifications of a markup language for displaying the secure data in a Web page rendered by a Web browser executed by the versatile computing device.

34. In a secure gaming environment which includes a public gateway and a private gateway, the private gateway for communicating directly with dedicated gaming devices over a secure private communication network, and the public gateway for communicating indirectly with versatile computing devices through a partner Web site, a method for controlling access to secure data within the secure gaming environment, the method comprising:

through the public gateway of the secure gaming environment, a secure gaming service providing a partner Web site with a certificate that authenticates the partner Web site with the secure gaming service;

establishing a user account with the secure gaming service, wherein the user account includes a first user ID, and wherein the first user ID is used by the secure gaming service when interacting with a dedicated gaming device of the user, the dedicated gaming device being configured to communicate with the secure gaming service only over a secure private communication network and through the private gateway;

the secure gaming service receiving a second user ID from the partner Web site and adding it to the user account, the second user ID being received through the public gateway over an insecure public communication network, wherein the second user ID was established by the user interacting with the partner Web site using a versatile computing device which is distinguished from the dedicated gaming device of the user in that a versatile computing device is not dedicated primarily to gaming, the second user ID being configured to allow the partner Web site to authenticate the user when the user communicates with the partner Web site;

linking the first user ID to the second user ID in the user account at the secure gaming service;

receiving a user request to access secure data of the secure gaming service, wherein the request is received over the insecure public communication network and from the partner Web site which authenticates the user using the second user ID, the partner Web site acting as an intermediary for the user request;

determining the user request is authentic; and the secure gaming service providing the requested access to the secure data of the secure gaming service over the insecure public communication network to the partner Web site, and thus to the versatile computing device over the insecure public communication network.

* * * * *

UNITED STATES PATENT AND TRADEMARK OFFICE
CERTIFICATE OF CORRECTION

PATENT NO. : 7,452,278 B2  
APPLICATION NO. : 10/434569  
DATED : November 18, 2008  
INVENTOR(S) : Ling Tony Chen et al.

Page 1 of 1

It is certified that error appears in the above-identified patent and that said Letters Patent is hereby corrected as shown below:

In column 8, line 23, delete "(" and insert -- (MU) --, therefor.

Signed and Sealed this
Third Day of May, 2011

David J. Kappos
*Director of the United States Patent and Trademark Office*